United States Patent
Lam et al.

(10) Patent No.: US 10,546,018 B2
(45) Date of Patent: Jan. 28, 2020

(54) SYSTEM AND METHOD OF COALESCING WRITES TO A HARDWARE TABLE IN A NON-DISRUPTIVE FASHION

(71) Applicant: Arista Networks, Inc., Santa Clara, CA (US)

(72) Inventors: Peter Lam, Anmore (CA); Navdeep Bhatia, Sunnyvale, CA (US); Simon Francis Capper, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/799,830

(22) Filed: Oct. 31, 2017

(65) Prior Publication Data

US 2019/0005148 A1 Jan. 3, 2019

Related U.S. Application Data

(60) Provisional application No. 62/526,965, filed on Jun. 29, 2017.

(51) Int. Cl.
| | |
|---|---|
| *G06F 16/901* | (2019.01) |
| *G06F 16/22* | (2019.01) |
| *G06F 16/27* | (2019.01) |
| *H04L 12/741* | (2013.01) |
| *H04W 28/16* | (2009.01) |

(52) U.S. Cl.
CPC ...... *G06F 16/9017* (2019.01); *G06F 16/2282* (2019.01); *G06F 16/27* (2019.01); *H04L 45/745* (2013.01); *H04W 28/16* (2013.01)

(58) Field of Classification Search
CPC ......... G06F 17/30952; G06F 17/30283; H04L 45/745; H04L 28/16
USPC .......................................................... 370/392
See application file for complete search history.

(56) References Cited

U.S. PATENT DOCUMENTS

| | | | | |
|---|---|---|---|---|
| 5,764,976 | A | * | 6/1998 | Hsiao ....................... G06F 9/524 |
| 7,826,469 | B1 | * | 11/2010 | Li ....................... H04L 47/2441 |
| | | | | 370/412 |
| 2013/0044636 | A1 | * | 2/2013 | Koponen ................ H04L 47/12 |
| | | | | 370/254 |

(Continued)

FOREIGN PATENT DOCUMENTS

EP 1623557 B1 * 10/2007 ............. H04L 45/00

*Primary Examiner* — Yemane Mesfin
*Assistant Examiner* — Intekhaab A Siddiquee
(74) *Attorney, Agent, or Firm* — Haley Guiliano LLP

(57) ABSTRACT

A method and apparatus of a network element that stores a lookup entry in a hardware table of a network element is described. In an exemplary embodiment, the network element receives a notification of a dirty lookup entry to be processed for a hardware table of a network element, where the hardware table includes a plurality of lookup entries. In addition, the network element determines a location for a table modification associated with the dirty lookup entry in the hardware table. Furthermore, the network element performs, with a hardware writer of the network element, the table modification associated with the lookup entry in a non-disruptive manner, where the hardware writer performs the table modification associated with the lookup entry in response to determining that the table modification associated with the lookup entry does not leave one of the plurality of lookup entries inconsistent after the table modification is performed.

18 Claims, 12 Drawing Sheets

(56) References Cited

U.S. PATENT DOCUMENTS

2018/0322062 A1* 11/2018 Watkins ............ G06F 17/30097

* cited by examiner

SYSTEM AND METHOD OF COALESCING WRITES TO A HARDWARE TABLE IN A NON-DISRUPTIVE FASHION

RELATED APPLICATIONS

The present application claims the benefit of priority of prior, co-pending provisional application Ser. No. 62/526,965, filed Jun. 29, 2017, the entirety of which is hereby incorporated herein by reference.

FIELD OF INVENTION

This invention relates generally to data networking, and more particularly, to coalescing updates to a hardware table of network elements and programming these updates to the hardware table in a non-disruptive manner.

BACKGROUND OF THE INVENTION

A network element can include two different planes that are used to process network traffic: a control plane; and a data plane that includes one or more hardware forwarding engines. The data plane receives, processes, and forwards network traffic using various configuration data (e.g., forwarding, security, quality of service (QoS), and other network traffic processing information). The control plane controls these processing functions of the data plane by configuring the data plane, managing data collected by the data plane, monitoring the data plane, and other management functions. The functions for each of the data and control planes are programmed by a software image, the network element operating system, that is stored on the network element.

Some of this control plane data will be programmed into the one or more data planes, such that this data is used by the data plane to process and forward network data received by the network element. For example, the control plane can receive routing protocol updates, address updates, updates to access control lists. In addition, this type of data will be needed to be stored in a priority order. In order for the data to be properly programmed in the correct priority order, a forwarding agent uses a first in first out (FIFO) queue to store the data for the data plane. A hardware writer retrieves the data from the FIFO and programs that hardware table in order. However, using the FIFO queue is flawed because each and every data is sent to the hardware writer. This can be a problem in a link flapping scenario, for example. where a link of the network element goes up and down. In this example, the same data can toggle back and forth between different values.

In addition, some of the hardware tables require existing entries to be moved before new entries can be added to the table. Moving existing entries can be disruptive unless the moves are performed in a specific order.

SUMMARY OF THE DESCRIPTION

A method and apparatus of a network element that stores a lookup entry in a hardware table of a network element is described. In an exemplary embodiment, the network element receives a notification of a dirty lookup entry to be processed for a hardware table of a network element, where the hardware table includes a plurality of lookup entries. In addition, the network element determines a location for a table modification associated with the dirty lookup entry in the hardware table. Furthermore, the network element performs, with a hardware writer of the network element, the table modification associated with the lookup entry in a non-disruptive manner, where the hardware writer performs the table modification associated with the lookup entry in response to determining that the table modification associated with the lookup entry does not leave one of the plurality of lookup entries inconsistent after the table modification is performed.

In a further embodiment, the network element stores a lookup entry in a hardware table of a network element. In this embodiment, the network element receives a lookup entry and determines metadata for the lookup entry. In addition, the network element stores the lookup entry in shared memory, where the stored lookup entry includes the metadata, a plurality of hardware writers independently accesses the lookup entry using the metadata, and at least one of the plurality of hardware writers performs a table modification associated with the lookup entry that results in a modification to an entry in a hardware table in a non-disruptive manner.

In another embodiment, network element stores a lookup entry in a hardware table. In this embodiment, the network element receives a lookup entry that includes a desired location to store the lookup entry in the hardware table. The network element further determines a location for the lookup entry in the hardware table by selecting a temporary location as the determined location in the hardware table for the lookup entry when storing the lookup entry in the desired location leaves the hardware table in an inconsistent state and selecting the desired location as the determined location in the hardware table for the lookup entry when storing the lookup entry in the desired location leaves the hardware table in a consistent state. In addition, the network element performs a table modification associated with the lookup entry using at least the determined location.

Other methods and apparatuses are also described.

BRIEF DESCRIPTION OF THE DRAWINGS

The present invention is illustrated by way of example and not limitation in the Figures of the accompanying drawings in which like references indicate similar elements.

DETAILED DESCRIPTION

Figure 1:
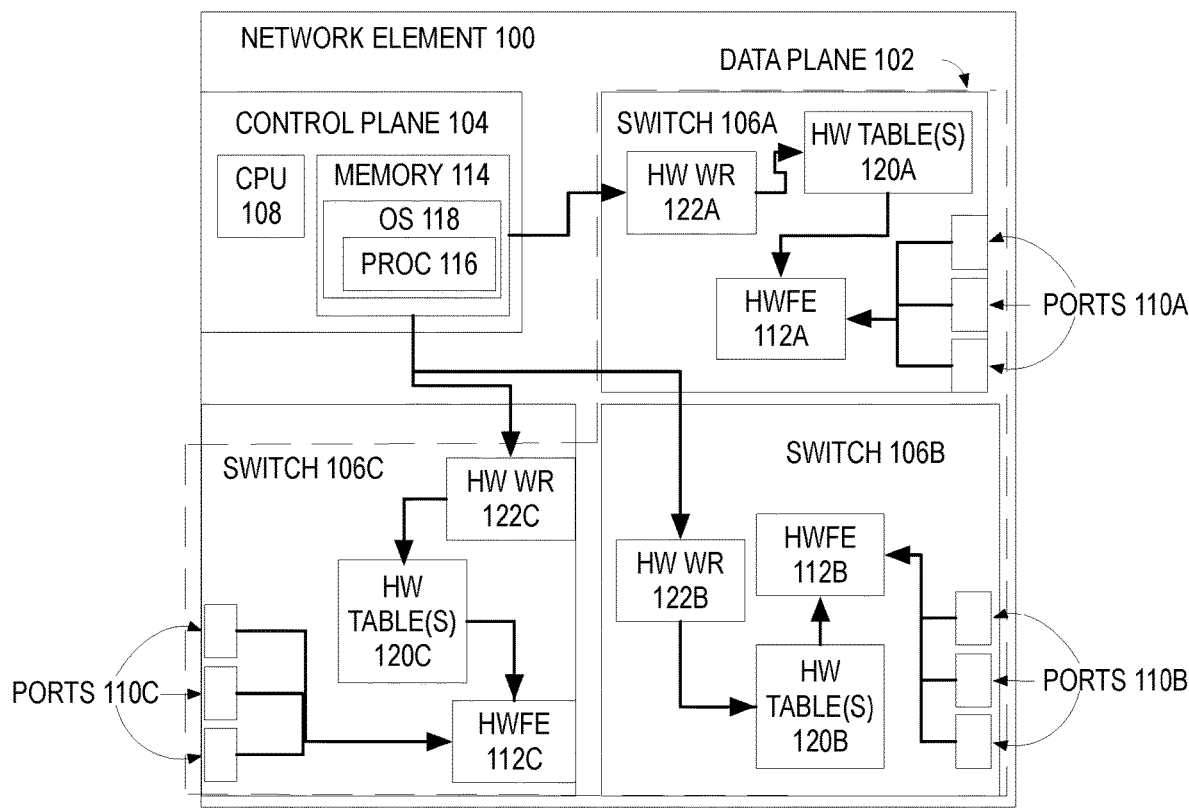
FIG. 1 is a block diagram of one embodiment of a network element that includes a control plane and multiple data planes, with the data plane communicating data to the control plane.

A method and apparatus of a network element that stores a lookup entry in a hardware table of a network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that stores a lookup entry in a hardware table of a network element is described. In one embodiment, the network element programs changes to a hardware table of the data plane by coalescing the data for a lookup entry in the hardware table and communicates these changes to the lookup entry in an ordered preserving fashion. In this embodiment, a forwarding agent in the control plane of the network element uses a shared memory system to communicate this lookup entry to a hardware writer, where the hardware writer programs the lookup entry in the hardware table. In one embodiment, the forwarding entry programs the changes to the lookup entry and the hardware table, stores the changes in shared memory, and the hardware writer determines if writing the lookup entry leaves the hardware table in a consistent state. Each lookup entry includes a desired location for a table modification associated with the lookup entry (e.g., a write to a lookup entry, a deletion of a lookup entry, and/or a move of one lookup entry from one location). A lookup entry write that leaves the hardware table consistent is, after the change to the lookup entry is made, the lookup entry is reachable and other lookup entries are also reachable by a reader of the hardware table (e.g., a packet processor) and lookup entries can honor the lookup entry priorities. If this table modification leaves the hardware table in a consistent state, the hardware writer performs the associated table modification (e.g., store a lookup entry, delete the lookup entry, and/or move the lookup entry). In one embodiment, a lookup entry includes a match criteria and a table action that corresponds to one or more physical entries in the hardware table and can be programmed at a plurality of locations.

If this write leaves the hardware table in an inconsistent state, the hardware writer determines if the performing the table modification for the lookup is dependent on another table modification that resolves the potential inconsistency. In one embodiment, if the table modification is to write a lookup entry in location 20 and there is a current lookup entry at location that has not been deleted or moved from the location, if the hardware writer performed that table modification, the previous lookup entry at location 20 would be lost. Instead of performing this table modification, the hardware writer can go look for the instruction for another lookup entry currently stored at location 20 to handle this entry. Alternatively, the hardware writer can mark the lookup entry that is to be processed as depending on another table modification for another lookup entry that handles that current entry at location 20. In a further embodiment, the hardware writer can mark the new lookup entry for location 20 as pending and loop over the pending lookup entries after each notification, since the hardware writer knows that the lookup entry at location 20 has a notification pending. In another embodiment, in addition, to a location collision, when checking for conflicts the hardware writer can check for priority inversions. For example and in one embodiment, assume that if the hardware table is a TCAM. If a TCAM, then, in this embodiment, location N has precedence over location N+1. and the current hardware table state is:

location N: priority 2
location N+1: empty
location N+2: priority 2

In this embodiment, if a lookup entry with priority 1 is destined for location N+1, the hardware writer cannot add this lookup entry at location N+1, because adding the lookup entry at this location would violate priority over the current entries in the hardware table.

In a further embodiment, the hardware writer can also detect if a deadlock situation occurs if the table modification associated with the lookup entry is performed. A deadlock situation can occur if there is a cycle in pending table modifications that includes one or more lookup entries currently programmed in the hardware table. In this embodiment, the hardware writer can use one or more temporary locations in the hardware writer to store the results of the table modification for the lookup entry (and/or other lookup entries as needed).

FIG. 1 is a block diagram of one embodiment of a network element 100 that includes a control plane 104 and a data plane 102, with the data plane 102 communicating data to the control plane 104. In one embodiment, the data plane 102 receives, processes, and forwards network data using various configuration data (e.g. packet forwarding (routing, switching, or another type of packet forwarding), security, quality of service (QoS), and other network traffic processing information). For example, for each received packet of the network traffic, the data plane determines a destination address of that packet, looks up the requisite information for that destination in one or more hardware tables 120A-C stored in the data plane, and forwards the packet out the proper outgoing interface. The data plane 102 includes multiple switches 106A-C that can each receive, process, and/or forward network traffic. In one embodiment, each switch 106A-C includes a hardware forwarding engine 112A-C and ports 110A-C, respectively. In one embodiment, the network element 100 can be a switch, router, hub, bridge, gateway, etc., or any type of device that can communicate data packets with a network. In one embodiment, the network elements 100 can be a virtual machine.

In one embodiment, the control plane 104 includes central processing unit (CPU) 108. As discussed herein, CPU 108 is interchangeably referred to as a control plane processor of network element 100. The CPU 108 is used to process information for the control plane 104 and write configuration data for hardware forwarding engines 112A-C in the switches 106A-C. The information processed by CPU 108 includes, for example, control plane data corresponding to a plurality of different classes of control plane traffic, such as routing protocol messages, routing table messages, routing decisions messages, route update messages, unresolved traffic messages, L2 protocol messages, link aggregation control protocol messages, link layer state updates messages (e.g., spanning tree messages), link state update messages (e.g., link aggregation control protocol messages for a link aggregation group, bidirectional forwarding detection messages, etc.), exception packets that cannot be dealt with in hardware (e.g., router alerts, transmission time interval messages, maximum transmission size exceeded messages, etc.), program messages (e.g., packets from a controller instructing the programming of a network element), messages for routing table misses, time control messages (e.g., precision time protocol messages), messages for packets marked as being of interest for snooping (e.g., access control list logging and port mirroring messages), messages used to collect traffic diagnostics, address resolution messages (ARP) requests and replies, neighbor solicitation requests and replies, general communication to the control plane of the networking device, etc. CPU 108 processes the control plane network data to perform control management updates and/or respond with control message responses (e.g., routing decisions, protocol updates, traffic resolutions, etc.).

In one embodiment, the control plane 108 further includes memory 114 that includes operating system 118 that is executing various processes. In this embodiment, the processes 116 are processes that execute the functionality of the control plane 104. In one embodiment, there can be processes 116 for quality of service, access control lists management (or other types of security), policy service, fan agent, light emitting diode agent, temperature sensor agent, database service, management service(s), processes to support networking protocols (e.g. spanning tree protocol (STP), routing protocols (e.g. such as routing information protocol (RIP), border gateway protocol (BGP), open shortest path first (OSPF), intermediate system-intermediate system (IS-IS), interior gateway routing protocol (IGRP), enhanced IGRP (EIGRP), protocol independent multicast (PIM), distance vector multicast routing protocol (DVMRP), and any/or other type or unicast or multicast routing protocol), Multiprotocol Label Switching (MPLS), and/or other types of networking protocols), network flow management applications (e.g., openflow, directflow), process manager, and/or other types of processes for other types of functionality of the network element 100.

In one embodiment, the data plane 102 receives, processes, and forwards network data, including control plane network data, using various configuration data (e.g., forwarding, security, quality of service (QoS), and other network traffic processing information). The data plane 102 includes multiple switches 106A-C that can each receive, process, and/or forward network traffic. Each of the switches 106A-C includes multiple ports 116A-C that are used to receive and transmit network data.

In one embodiment, for each received unit of network data (e.g., a packet), the data plane 102 determines a destination address for the network data, looks up the requisite information for that destination in one or more tables stored in the data plane, and forwards the data out the proper outgoing interface, for example, one of the interface devices 106A-C. In one embodiment, each switch 106A-C includes one or more hardware forwarding engines (HWFE(s)) 112A-C and ports 116A-C, respectively. Each hardware forwarding engine 112A-C forwards data for the network element 100, such as performing routing, switching, or other types of network forwarding or processing.

In one embodiment, for each received unit of control plane data, the data plane 102 forwards the control plane network data to the CPU 108 (e.g., the control plane processor). In one embodiment, the control plane 104 gathers configuration data for the hardware forwarding engines 112A-C in control plane network data messages from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 112A-C.

The data plane 102 further includes hardware tables 120A-C that are one or more tables used to configure the processing of the incoming handled by the hardware forwarding engines 112A-C. In one embodiment, the hardware tables 120A-C are used to store configuration data, monitoring data, reporting data, statistics, and any other data the hardware forwarding engine uses or collects. In one embodiment, the hardware tables 120A-C can include a routing table, MAC table, ACL, and other tables. For example and in one embodiment, the routing table stores routing table entries which may be produced by any of the running protocols known in the art such as routing information protocol (RIP), border gateway protocol (BGP), open shortest path first (OSPF), intermediate system-intermediate system (IS-IS), interior gateway routing protocol (IGRP), enhanced IGRP (EIGRP), protocol independent multicast (PIM), distance vector multicast routing protocol (DVMRP), and any/or other type or unicast or multicast routing protocol known in the art. The routing table entries may be used to forward packets that are encoded with one of the address families known in the art such as IPv4 unicast, IPv6 unicast, IPv4 multicast, or IPv6 multicast. The MAC table is a table of MAC addresses known to the hardware forwarding engine and Virtual Local Area Network (VLAN)s and ports that these MAC address are associated with. In one embodiment, the MAC table is used for layer 2 forwarding. In another embodiment, the MAC table records a MAC address and VLAN and an associated tunnel interface. This tunnel may be a Virtual eXtensible LAN (VXLAN) tunnel, a Generic Routing Encapsulation (GRE) tunnel, an L2TP tunnel, an Internet Protocol (IP)-in-IP tunnel, a Multiprotocol Label Switching (MPLS) label, or one of any number of tunneling formats known in the art. In one embodiment, the ACL consists of an ordered series of rules, where each rule has a match criterion and action. In this embodiment, the ACL is applied to the network data against these rules in order, and taking the action of the first rules that matches. In one embodiment, the other tables are set of one or more tables that is used to store statistics, monitoring data, other configuration data, stored events, management data, and/or other data the hardware forwarding engine uses or collects.

Figure 2:
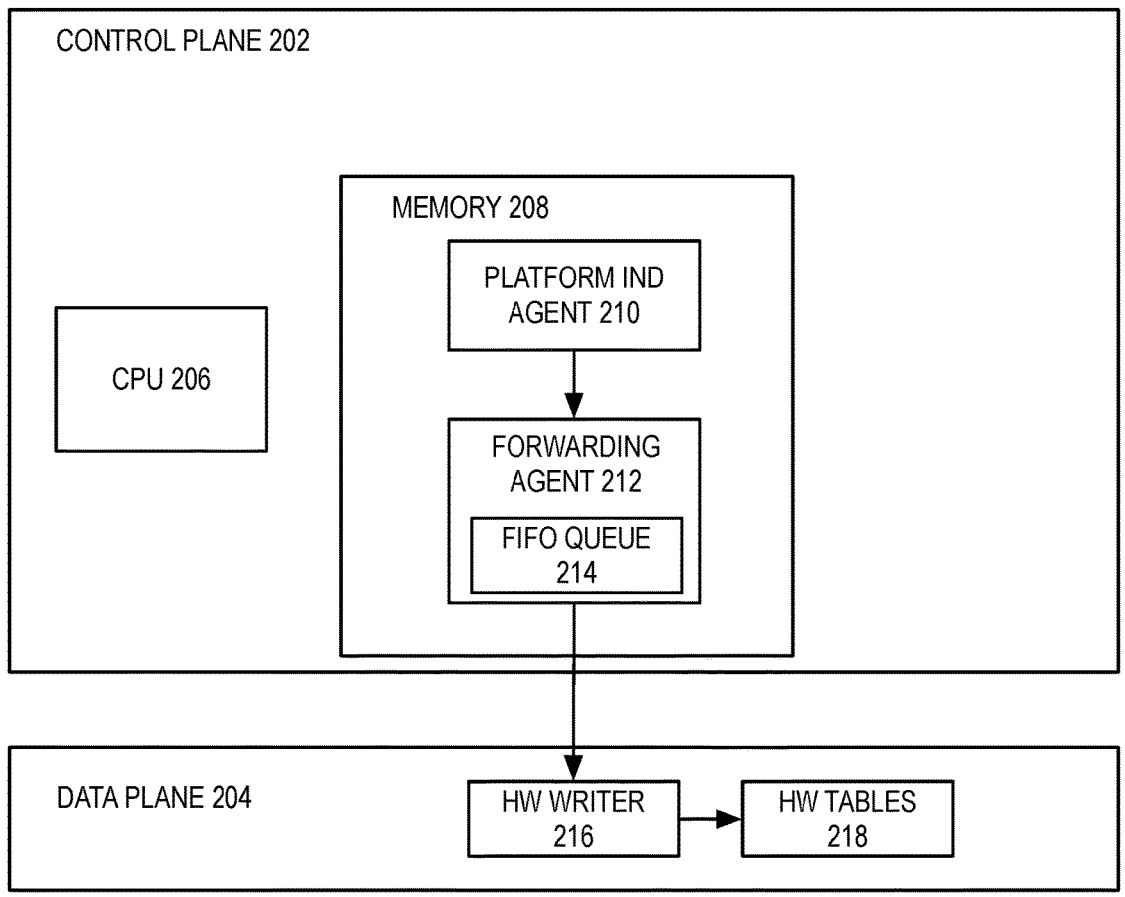
FIG. 2 is a block diagram of one embodiment of a network element with a forwarding agent sending hardware table updates using a first-in, first-out queue.

FIG. 2 is a block diagram of one embodiment of a network element 200 with a forwarding agent 212 sending hardware table updates using a first-in, first-out queue 214. In FIG. 2, the network element 200 includes the control plane 202 and data plane 204. In one embodiment, the control plane 202 and data plane 204 are the control and data plane as described in FIG. 1 above. In one embodiment, the control plane 204 includes CPU 206 and memory 208, where the memory 208 includes a platform independent agent 210 and forwarding agent 212. In one embodiment, the CPU 206 used to process control plane data for the control plane 202. In addition, the platform independent agent 210 processes control plane data in a platform agnostic manner into one or more lookup entries for the forwarding agent 212. In one embodiment, the platform independent agent 210 processes the control plane data without regards to the type of hardware in the data plane.

In one embodiment, the forwarding agent 212 receives the one or more lookup entries from the platform independent, further process the one or more lookup entities, and sends these one or more lookup entities to the hardware writer. In this embodiment, the forwarding agent 212 can react to new lookup entries and derive hardware layout of the hardware table 218. In this embodiment, because each of the lookup entries may include priority, priority group, key, value, operation identifier, location and/or other characteristics, the one or more lookup entries need to be written out in an order preserving manner. While in one embodiment, the data plane 204 is illustrated with one hardware writer 216 and hardware table 218, in alternate embodiments, there can be multiple hardware writers 216 and hardware tables 218. In particular, there can be more than one hardware table 218 for each hardware writer 216. In one embodiment, the key is a criterion that indicates whether this entry applies to a packet being forwarded. The key can be an exact match key or a key-mask that can be for a TCAM or longest prefix match (LPM) lookup. In one embodiment, the priority can be used in the case where a packet can match multiple entries (e.g., in an LPM or TCAM lookup). In this embodiment, the priority can be used to decide which entry is applied. In one embodiment, the priority group is used to restrict the scope of a priority to within a group of lookup entries. In this embodiment, a hardware table can be logically partitioned into separate priority groups. For example and in one embodiment, a hardware table can have separate groups of ACLs in a TCAM or separate VRFs in a LPM table. In one embodiment, the value describes the action that is applied to a packet if it matches a lookup entry. In one embodiment, the operation identifier is an increasing value that is incremented when a lookup entry is updated (e.g., a monotonically increasing integer, timestamp, and/or another type of increasing value). This allows the forwarding agent 212 know when the hardware is programmed with a state. While in one embodiment, the hardware table 218 can include a TCAM, in alternate embodiments, the hardware table 218 can include a different type of table (e.g., a hash table (e.g. a Cuckoo hash table), a trie, and/or another type of table used to store information used by a network element). In one embodiment, the hardware table 218 can include or more individual tables.

In one embodiment, the lookup entries are used to store data in the hardware table 218. Each of the lookup entries can include a key, value(s), and/or a priority. There can be different types of lookup entries that are stored in the hardware tables. For example and in one embodiment, there can be lookup entries for forwarding entries, access control lists (ACL), Internet Protocol (IP) v4 and IP v6 hosts table, IPv4 and IPv6 LPM routing tables, virtual local area network (VLAN) translations, Quality of Service (QoS) maps, Layer-2 forwarding tables, tunnel termination tables, and/or other types of lookup entries. In this example, some of the lookup entries can include a priority, in which one or more of the lookup entries take priority over the other lookup entries having of the same type.

In one embodiment, the hardware writer 216 manages of one or more processing units in the data plane and further controls memory components used to program the hardware tables. The lookup entries are generated by the forwarding agent 212, and the forwarding agent 212 synchronizes the lookup entries to the hardware writer 216, which then writes the lookup entries to hardware table 218.

In one embodiment, one way to transfer the lookup entries from the forwarding agent 212 to the hardware writer 216 is via a first in first out (FIFO) queue 214 of hardware operations. This FIFO queue 214 has to be lossless and requiring flow control between the forwarding agent 212 and hardware writer 216, so as to prevent the queue length from growing unbounded. When the hardware table is reinitialized in a running network element, the forwarding agent 212 should generate a queue of events that programs the entire hardware table for the data plane. In addition, there is one FIFO 214 for multiple hardware writers 216 or there can be one FIFOs 214 for each of the multiple hardware writers 216.

In one embodiment, instead of using a FIFO queue 214, the network element can have the hardware tables in a share state between the forwarding agent and hardware writer. In this embodiment, this shared state can be coalesced so if the hardware writer is unable to keep up with the rate of churn of a table, the coalescing will shed a load as the table changes coalesce. If the hardware writer restarts, hardware writer can attach to the shared state, and reprogram hardware without interfering with the forwarding agent 212.

In one embodiment, hardware table writes must be made in an order so as to prevent mis-forwarding of packets. In addition, table write order is critical to ensure a "make before break" functionality when shuffling entries in hash tables or ternary content-addressable memory (TCAMs). In one embodiment, make before break is a sequence of hardware writes for adding, removing, or updating a hardware table that does not disrupt traffic. A traffic disruption can be transient drops, transiently applying a lower priority match when a higher priority match exists, and/or another type of traffic disruption. For example and in one embodiment, in TCAMs, the priority order of entries must be maintained to ensure correct forwarding and processing of packets.

In one embodiment, a hardware table that disrupts traffic is a hardware table that is not in a consistent state. In this embodiment, an inconsistent state for the hardware table is a hardware table that includes a lookup entry that is not accessible (e.g., another lookup entry has overwritten this lookup entry or another lookup entry blocks this lookup entry (e.g., priority inversion), or this lookup entry is written or moved to a location that leaves this lookup entry inaccessible). Alternatively, a hardware table inconsistent state can result from a lookup entry stored in the hardware table that an increased or decreased matching space that this lookup entry should have in a consistent state. For example and in one embodiment, another lookup entry may partially block an address range (or port range, or another range of packet characteristics) because of a priority inversion (e.g. installing a shorter prefix above a longer prefix in a TCAM). In this example, part of the address range may apply on a lookup, instead of the full address range apply as it would if the hardware table was in a consistent state. Alternatively, this lookup entry could have a partially or full address range (or another packet characteristic range) that available when it should not have (e.g. due to a priority inversion or incorrect location). This increased matching space of address range can cause a packet lookup to improperly match to this lookup entry because of the hardware table inconsistency. In one embodiment, a lookup entry in the hardware table can be inconsistent (e.g., blocking, being blocked, increased matching space, and/or decreased matching space).

A coalesced table, however, does not preserve a make before break functionality. In one embodiment, some entries may get coalesced in such a way that a traffic disruption would occur. In one embodiment, in the case of a 2-way cuckoo hash, let:

a) entry A is already programmed into the table at location 1. Entry A can be programmed at location 1 or location 3 b) entry B is already programmed into the table at location 2. Entry B can be programmed at location 2 or location 3 c) entry C is being added to the table. Entry C can be programmed at location 1 or location 2.

When the forwarding agent 212 is adding C, the forwarding agent 212 can use the following sequence to do a non-disruptive add:

1) move entry A to location 3
2) add entry C to location 1

Usually, the forwarding agent 212 just puts #1 then #2 into a FIFO message queue and it gets executed in order. If the forwarding agent 212 processes #2 first, the forwarding agent 212 will introduce transient drops as entry A is temporarily removed from the table. Typically with a coalescing table, the forwarding agent 212 would use the location as the table index. This would encode the above sequence as:

i) Update location 3 w/entry A
ii) Update location 1 w/entry C

However, there is no guaranteed processing order between i) and ii) because i) may get coalesced with a future operation. For example, if in the future:

iii) delete entry A.

The reader may only see ii), where i) and iii) get coalesced.

In one embodiment, the hardware table determines a clean/dirty designation for each of the lookup entries stored in the shared memory (described below), where a clean lookup entry means that the hardware writer has processed the stored lookup entry and a dirty lookup entry means that the hardware writer has not processed the stored lookup entry. In one embodiment, for a given lookup entry, the hardware writer compares the operation identifier for the lookup entry stored in the hardware table and shared memory system. In this embodiment, as described above, the operation identifier is an increasing identifier, such that a lookup entry with a larger operation identifier is a more recent operation identifier than one with a lower operation identifier. Thus, the hardware writer can use the operation identifiers as a way to determine a clean/dirty status of a lookup entry. If a lookup entry in the shared memory system has an operation identifier that is greater than a lookup entry in a hardware table, then this lookup entry is dirty. Otherwise, if the operation identifiers of corresponding lookup entries are the same in the hardware table and the shared memory system, the lookup entry is clean. In addition, if the hardware writer restarts, hardware writer can attach to the shared state in the shared memory system, and reprogram hardware without interfering with the forwarding agent.

Figure 3:
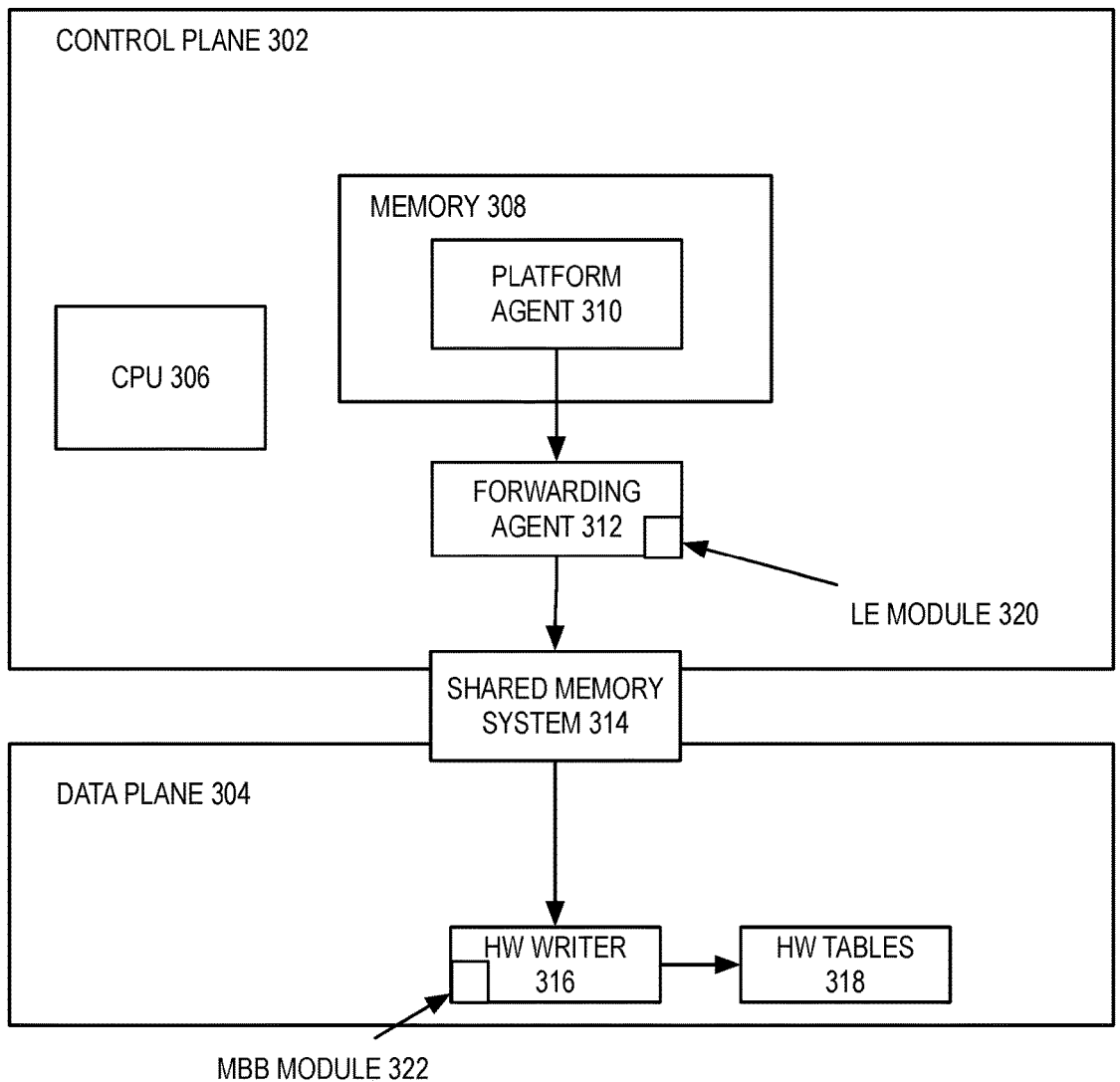
FIG. 3 is a block diagram of one embodiment of a network element with a forwarding agent sending hardware table updates using a shared memory management system.

FIG. 3 is a block diagram of one embodiment of a network element 300 with a forwarding agent 312 sending hardware table updates using a shared memory management system 314. In FIG. 3, the network element 300 includes the control plane 302 and data plane 304. In one embodiment, the control plane 302 and data plane 304 are the control and data plane as described in FIG. 1 above. In one embodiment, the control plane 304 includes CPU 306 and memory 308, where the memory 308 includes a platform independent agent 310 and forwarding agent 312. In one embodiment, the CPU 306 used to process control plane data for the control plane 302. In addition, the platform independent agent 310 processes control plane data in a platform agnostic manner into one or more lookup entries for the forwarding agent 312. In one embodiment, the platform independent agent 310 processes the control plane data without regards to the type of hardware in the data plane.

In one embodiment, the forwarding agent 312 receives the one or more lookup entries from the platform independent agent 310, further process the one or more lookup entities, and sends these one or more lookup entities to the hardware writer. In this embodiment, the forwarding agent 312 can react to new lookup entries and derive the hardware layout of tables. While in one embodiment, the data plane 304 is illustrated with one hardware writer 316 and hardware table 318, in alternate embodiments, there can be multiple hardware writers 316 and hardware tables 318. In particular, there can be more than one hardware table 318 for each hardware writer 316. In one embodiment, the hardware writer maintains a separate state per hardware table 318. In addition, multiple hardware writers 316 can attach to the same shared memory system 314.

In FIG. 3, instead of using a FIFO queue to send new lookup entries to the data plane 304, the control plane 302 and data plane 304 use a shared memory system 314 to share new lookup entries from the forwarding agent 312 to the hardware writer 314. In one embodiment, the shared memory system 314 receives new lookup entries from the forwarding agent 312. The shared memory system 314 stores each of the new lookup entries in memory that is shared, and therefore retrievable, by the control 302 and data 304 planes. Thus, lookup entries stored in the shared memory system 314 by the forwarding agent 312 are retrievable by the hardware writer 316. In addition, and in one embodiment, the shared memory system 314 notifies the hardware writer 316 to changes in the lookup entries stored in the shared memory system 314 (e.g., addition of new lookup entries, updates to existing lookup entries, deletion of lookup entries, and/or other changes to the lookup entries).

Furthermore, and in one embodiment, the shared memory system 314 coalesces lookup entries stored in the same slot in the shared memory system 314. In this embodiment, if there are multiple lookup entries being stored with the same key in the shared memory system 314 before the hardware writer 316 reads the new lookup entries, the hardware writer 316 reads the latest version of the lookup entry. For example and in one embodiment, if a lookup entry for a next hop rapidly changes between different values because of a link flapping situation (or a normal move due to a table add), when the hardware writer 316 reads this lookup entry, the hardware writer 316 reads the latest version of the lookup entry. As another example, and in one embodiment, the shared memory system 314 is the dynamic shared memory hash table with notifications as described in the U.S. patent application Ser. No. 15/187,698, entitled "SYSTEM AND METHOD OF A DYNAMIC SHARED MEMORY HASH TABLE WITH NOTIFICATIONS," filed on Jun. 16, 2016.

In one embodiment, each lookup entry has an associated key that is used by the shared memory system 314 to notify a hardware writer 316 of a change a lookup entry in the shared memory system 314. The hardware writer 316 will react to the notifications in the shared memory system 314 and perform the table modification for the hardware table 318 to program the hardware.

In one embodiment, there are different types of table model use for writing data to the hardware table and one for reporting table status. For example and in one embodiment, because hash, TCAM, and direct index tables have different make before break requirements, the table models are different for these three types of tables.

For table layouts, and in one embodiment, the forwarding agent 312 computes the table layout once for a lookup entry that is to be programmed into the hardware table 318. If there are multiple values of that lookup entry being generated, the table programming for this lookup entry can be coalesced. This allows the forwarding agent 312 to determine the table layout and the table programming without waiting for the hardware writer 316 to act. In one embodiment, examples of lookup entry coalescing by the shared memory system 314 are:
    add/delete/add=>add
    add/move=>add
    add/delete/add/move=>add
    move/move/move=>move
    add/update/update=>add
    update/update/update=>update
    add/move/update=>moveAndUpdate
    add/move/move/delete=>delete In these examples, each of the lookup entries are sent to the shared memory system 314 by the forwarding agent 312 and the shared memory system 314 coalesces the lookup entries. Thus, the hardware writer 316 processes the coalesced lookup entries and not each individual lookup entry sent to the shared memory system 314. In one embodiment, the coalescing can result is a tremendous improvement to the performance of the network element 300 as the number of coalesced lookup entries can dramatically reduce the number of lookup entries to be processed by the hardware writer (e.g. up to 50%). In one embodiment, the lookup entries are coalesced by the key associated with the lookup entry.

If a lookup entry is to be programmed into the hardware table 318, this lookup entry is to be found until this lookup entry is deleted. For example and in one embodiment, if a cuckoo hash type of hardware table 318 requires moving entries to accommodate a new lookup entry addition to the hardware table 318, the existing lookup entries must not transiently enter a "not found" state. This "not found" state for a lookup entry can occur if a lookup entry is transiently deleted during a move. Thus, any programming of a lookup entry by the forwarding agent should be done in a "make before break" fashion, where the lookup entry being programmed or existing lookup entries do not enter a "not found" state.

Furthermore, and in one embodiment, if a lookup entry is programmed into hardware, this lookup entry should be consistent with other lookup entries in the table. For example and in one embodiment, if an ACL lookup entry needs to be shuffled in a TCAM, the ACL rules must be shifted in a specific order to prevent incorrect lookups. If a set of ACL lookup entries are indexed as:
    Seq 10=>index 10
    Seq 20=>index 11
    Seq 30=>index 12
and the forwarding agent 312 is move this ACL sequence to:
    Seq 10=>index 20
    Seq 20=>index 21
    Seq 30=>index 23.
The forwarding agent programming order operation should be Seq 30=>index 23, Seq 20=>index 21, and Seq 10=>index 10. If Seq 10 is moved first, the hardware table 318 will have a temporarily invert of the lookup precedence end the consistency of this ACL sequence is temporarily lost.

In addition, and in one embodiment, any movement of lookup entries in a hash table that is part of hardware table 318 should be done in a consistent fashion. If a lookup entry is programmed into a hash table of the hardware table 318, that lookup entry must be able to be found, until it is deleted.

For TCAM consistency, and in one embodiment, TCAM have an additional property of prioritized searches. The hardware writer 316 should must preserve this property when inserting new lookup entry. If a TCAM is used for an ACL, the forwarding agent 312 assigns each ACL a unique Priority Group and sets the ACL lookup entry priority to the ACL sequence number. In one embodiment, when inserting or moving an ACL lookup entry, the hardware writer 316 ensures that a new table index is be between the logical previous and next lookup entry in the ACL. For example,
    1. Seq 10 10.0.0.0/24 permit
    2. Seq 20 deny any any
    3. Seq 15 12.0.0.0/24 permit In one embodiment, when processing the request for lookup entry #2, the forwarding agent 312 inserts lookup entry #2 with a new table index below lookup entry #1 because of the sequence number is higher. When processing the request for lookup entry #3, the table index for Seq 15 must be between Seq 10 and Seq 20. If it is not, the hardware writer 316 defers processing the request.

In a further embodiment, a valid TCAM layout may interleave LE from different ACL. For example,
    ACL A/Seq 20
    ACL B/Seq 10
    ACL A/Seq 30
    ACL B/Seq 20
    ACL A/Seq 50

If an ACL rule is to be expanded into multiple TCAM entries, such as to support ranges, each entry will be a separate lookup entry request. The priority of the expanded lookup entry can be the same.

In another embodiment, an LPM implemented via TCAM can be modeled as a single ACL where prefixes of the same lengths are assigned to the same priority. In case of LPM, these prefixes belong to the same lookup entry Priority-Group and the lookup entry priority is a function of the prefix length.

The forwarding agent 312 places the /32 prefixes above /31 prefixes which are above /30 prefixes, etc. Within a prefix length, the prefix can be in any order and there may be unused table entries between prefixes of the same length. For example, 10.10.10.1/32 at table index 2
    10.10.10.2/32 at table index 3
    10.10.10.3/32 at table index 12
    20.10.10.0/24 at table index 50
    10.10.11.0/24 at table index 51
    10.10.10.0/24 at table index 72
    10.10.12.0/24 at table index 172
    10.10.0.0/16 at table index 173

A lookup entry should exist once in a table unless the lookup entry is being moved. In case of add/delete/add, the two adds should coalesce into a single add instead of two separate adds. This prevents an entity from transiently existing more than once in a lookup table with unpredictable results. Coalescing the two adds also helps minimize the churn in the communication channel between the forwarding agent 312 and hardware writer 316.

In a further embodiment, it is possible for the forwarding agent 312 request a layout that results in deadlock for the hardware writer 316. This can happen if the hardware writer 316 lags behind the forwarding agent 312 for several transactions, or restarts. A deadlock can occur when there is a cycle in the requested lookup entry table indices.

In another embodiment, an example of hash table deadlock is:
Initial forwarding agent 312 state:
    MAC A at index 10
    MAC B at index 11
    Index 12 empty
Request #1: Insert MAC C, which pushes MAC B to index 12:
    MAC A at index 10
    MAC C at index 11
    MAC B at index 12
Request #2: Delete MAC C:
    MAC A at index 10
    Index 11 empty
    MAC B at index 12
Request #3: Insert MAC D, which pushes MAC A to index 11
    MAC D at index 10
    MAC A at index 11
    MAC B at index 12
Request #4: Delete MAC D
    Index 10 empty
    MAC A at index 11
    MAC B at index 12
Request #5: Insert MAC E, which pushes MAC B to index 10
    MAC B at index 10
    MAC A at index 11
    MAC E at index 12

If the all the requests from 2 through 5 are coalesced, the final forwarding agent 312 requests have a cycle with MAC A and MAC B.

One way to break the deadlock is to ensure the hardware writer 316 has a place to temporarily store MAC addresses. For example, if there is an empty slot that can temporarily hold a MAC address, the hardware writer 316 can use it to break the cycle.

In one embodiment, a TCAM deadlock can occur in a similar fashion, however, a stash cannot be used to break the deadlock because a TCAM must preserve rule priority during lookups. To break TCAM deadlock, the forwarding agent 312 can reserve the lowest and highest entries for hardware writer 316 to break deadlocks. For example, assume the following deadlock:
Hardware writer 316 State:
    Table index 0 empty (reserved)
    ACL A/Seq 10 at table index 10
    ACL A/Seq 20 at table index 11
    ACL B/Seq 10 at table index 12
    ACL B/Seq 20 at table index 13
    table index <last>empty (reserved)
Forwarding agent 312 Request:
    ACL A/Seq 10 at table index 12
    ACL A/Seq 20 at table index 13
    ACL B/Seq 10 at table index 10
    ACL B/Seq 20 at table index 11
The hardware writer 316 can form a conflict free processing order via:
    ACL A/seq 10 move to table index 0
    ACL B/seq 10 move to table index 10
    ACL A/seq 20 move to table index 12
    ACL B/seq 20 move to table index 11
    ACL A/seq 20 move to table index 13
    ACL A/seq 10 move to table index 12

In one embodiment, conflict free processing order is an order of processing for a subset of lookup entries such that there are no conflicts. In this embodiment, a conflict can be (i) adding or moving a lookup entry to a table location that is already occupied, or (ii) adding or moving to a table location that would violate priority with entries already in the table. In addition, let a coalescing table indicate the set of lookup entries that need to be updated, where an update is either: 1) adding a new entry to the table; 2) deleting an existing entry from the table; 3) updating an existing entry in the table; 4) moving an existing entry in the table; and/or some combination thereof.

In a case of using a cuckoo hash, a conflict would be an occupancy conflict. In an example (and embodiment) where: (i) entry A moves from location 1 to location 3 (that is empty) and (ii) entry C get added to location 1, the order of processing the operations for entry A and entry C can give different results. The forwarding agent 312 would look at the operation for entry A and determine that this entry has a pending move to location 3, which is empty. The conflict free processing order for these two operations would be the operation for A, followed by the operation for C. In one embodiment, the conflict free processing order starts by being notified on a "dirty" lookup entry. The conflict free processing order looks at where that lookup entry wants to go. If the forwarding agent think something is already there, the forwarding agent can determine if the blocking lookup entry is "dirty" and where it wants to go. Eventually the forwarding agent ends up at an empty space and this is the "path" for that lookup entry. When dealing with lookup entries with a priority (e.g. LPM, TCAMs), the lookup entry can get blocked because of priority as well as the occupancy.

In another embodiment, an LPM deadlock can occur within a prefix length range. For example, assume the following deadlock.
Hardware Writer 316 State:
    10.10.10.128/25 at table index 9
    10.10.10/24 at table index 10
    10.10.11/24 at table index 11
    10.10.10.0/23 at table index 12

Forwarding agent 312 Request:
 10.10.10.128/25 at table index 9
 10.10.10/24 at table index 11
 10.10.11/24 at table index 10
 10.10.10.0/23 at table index 12

Reserving the lowest and highest entry does not help resolve deadlock here. Instead, the forwarding agent 312 should reserve an entry per prefix length range for a stash. In one embodiment, reserving a prefix length can be performed in a variety of ways. One way is for the forwarding agent 312 to reserve sentinel lookup entries that are not programmed into the hardware. The forwarding agent 312 responsible for specific hardware table layout, which is the mapping of the platform independent 310 configuration requests into a specific hardware implementation. The forwarding agent 312 can maintain these sentinel lookup entries and lookup entries can use them accordingly. Another way is if the hardware writer 316 is a software development kit, the hardware writer 316 can provide application programming interfaces (APIs) to temporarily move entries into a stash. That may require hardware writer 316 to maintain more state.

As described above, the forwarding agent can program the lookup entries in the shared memory system, where the hardware writer reads the lookup entries from the shared memory system. In addition, the shared memory system handles the coalescing of multiple values of the lookup entries, so that the hardware writer can retrieve the latest version of the value for that lookup entry.

Figure 4:
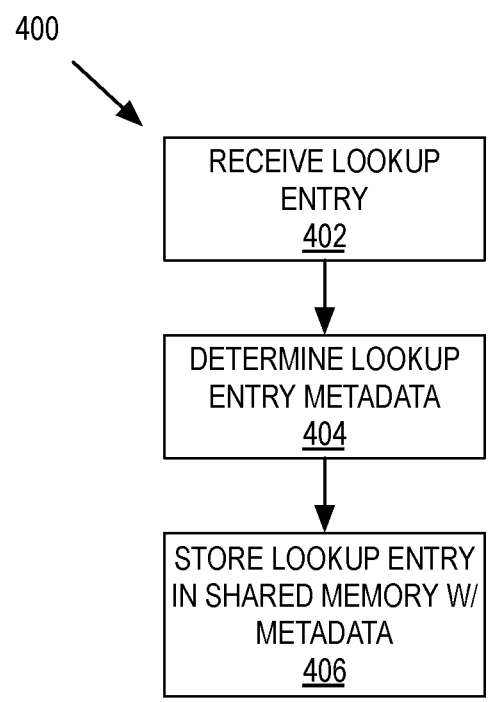
FIG. 4 is flow diagram of one embodiment of a process to store a lookup entry in the shared memory system.

FIG. 4 is flow diagram of one embodiment of a process 400 to store a lookup entry in the shared memory system. In one embodiment, a shared memory system coalesces the entries, such as the shared memory system 314 as described in FIG. 3 above. In one embodiment, a lookup entry module perform process 300 to store the lookup entry, such as the lookup entry module 320 described in FIG. 3 above. In FIG. 4, process 400 begins by receiving a lookup entry at block 402. In one embodiment, a lookup entry can be a forwarding lookup entry, an ACL lookup entry, address lookup entry, and/or another type of lookup entry. At block 404, process 400 determines the metadata for the lookup entry. In one embodiment, the lookup entry metadata can include stores the lookup entry in the shared memory system. In one embodiment, by storing the lookup entry in the shared memory system, one or more readers (e.g., the hardware writer 316 as described in FIG. 3 above) can access this lookup entry. Process 400 coalesces the lookup entry in the shared memory system by coalescing the notifications of the lookup entries being forwarded to the hardware writer. In this embodiment, the forwarding agent and hardware writer operate independently by running at their own speed, within bounded memory and with an O(1) complexity. In addition, concurrency of writes and reads in the shared memory system are handled via wait-free and lock-free data protocols by using 64-bit atomic load/store operations. In this embodiment, atomic read-modify-write variants are not needed. Furthermore, the dynamic shared table does not utilize shared locks, which allows linear scaling of throughput over multiple CPUs as more readers and writers are added. In addition, the dynamic shared table can grow and shrink as needed, depending on the state of the running network element. In addition, the shared memory system can send notifications to the hardware writer for changes to lookup entries in the shared memory system. In one embodiment, the shared memory system is further described in U.S. Patent Publication No. 2017/0068700, entitled "System and Method of a Shared Memory Hash Table Dynamic Shared Memory Hash Table with Notification", filed on Jun. 20, 2016, which are incorporated by reference herein.

Figure 5A:
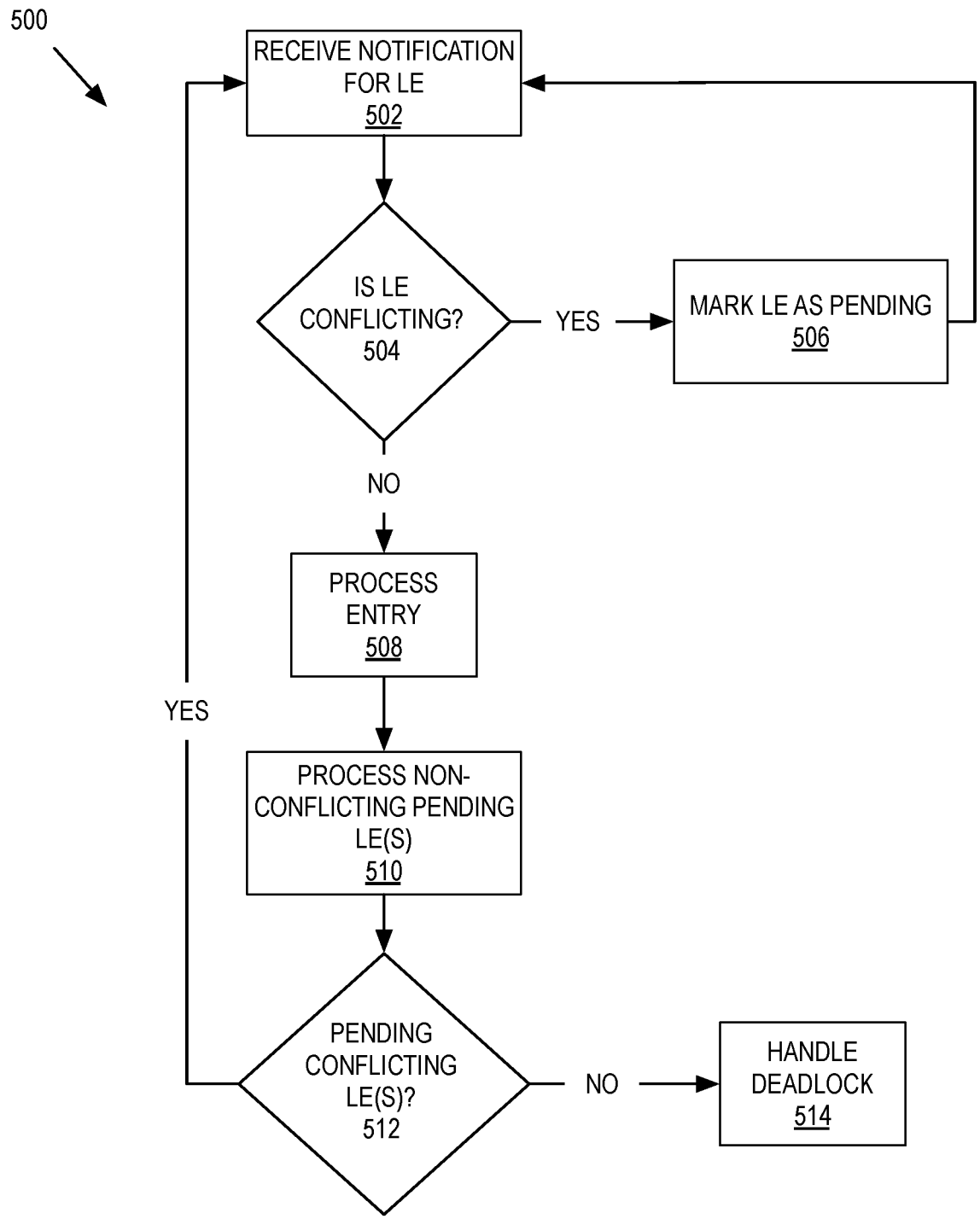
FIG. 5A is flow diagram of one embodiment of a process to process a lookup entry.

FIG. 5A is flow diagram of one embodiment of a process to process a lookup entry. In one embodiment, a hardware writer performs process 500 to process the process a lookup entry, such as the hardware writer 316 as described in FIG. 3 above. In FIG. 5A, process 500 begins by receiving a notification for the lookup entry at block 502. In one embodiment, process 500 receives a notification of a lookup entry from the shared memory system, such as the shared memory system 314 as described in FIG. 3 above. In one embodiment, process 500 compares the operation identifier of a lookup entry that exists in the hardware table with the lookup entry corresponding to the lookup entry. If the operation identifier of the lookup entry in the shared memory system is greater, process 500 proceeds with processing the lookup entry corresponding to the notification. At block 504, process 500 determines if the lookup entry is conflicting. Conflicting lookup entries can result from location conflicts, priority conflicts, and/or other types of conflicts. For example and in one embodiment, if a lookup entry is a write to location 20 in a hardware table, a conflict can arise if there is an existing lookup entry at location 20 that has not been deleted or moved from this location. If there is a conflicting lookup entry, process 500 marks the current lookup entry as pending at block 506. Execution proceeds to block 502 above.

If the lookup entry is not conflicting, process 500 processes the lookup entry at block 508. For example and in one embodiment, process 500 can write a lookup entry to a location, delete a lookup entry from a location, or move a lookup entry from one location to another. At block 510, process 500 process loops through the pending lookup entries and processes the non-conflicting lookup entries. In one embodiment, process 500 processes each of these entries as described in block 508 above. Process 500 determines if there are any pending conflicting lookup entries at block 512. If there are any pending conflicting lookup entries, execution proceeds to block 502 above. If there are no more pending conflicting lookup entries, process 500 handles any potential deadlock at block 514. In one embodiment, process 500 handles the deadlock as described in FIG. 5D below.

Figure 5B:
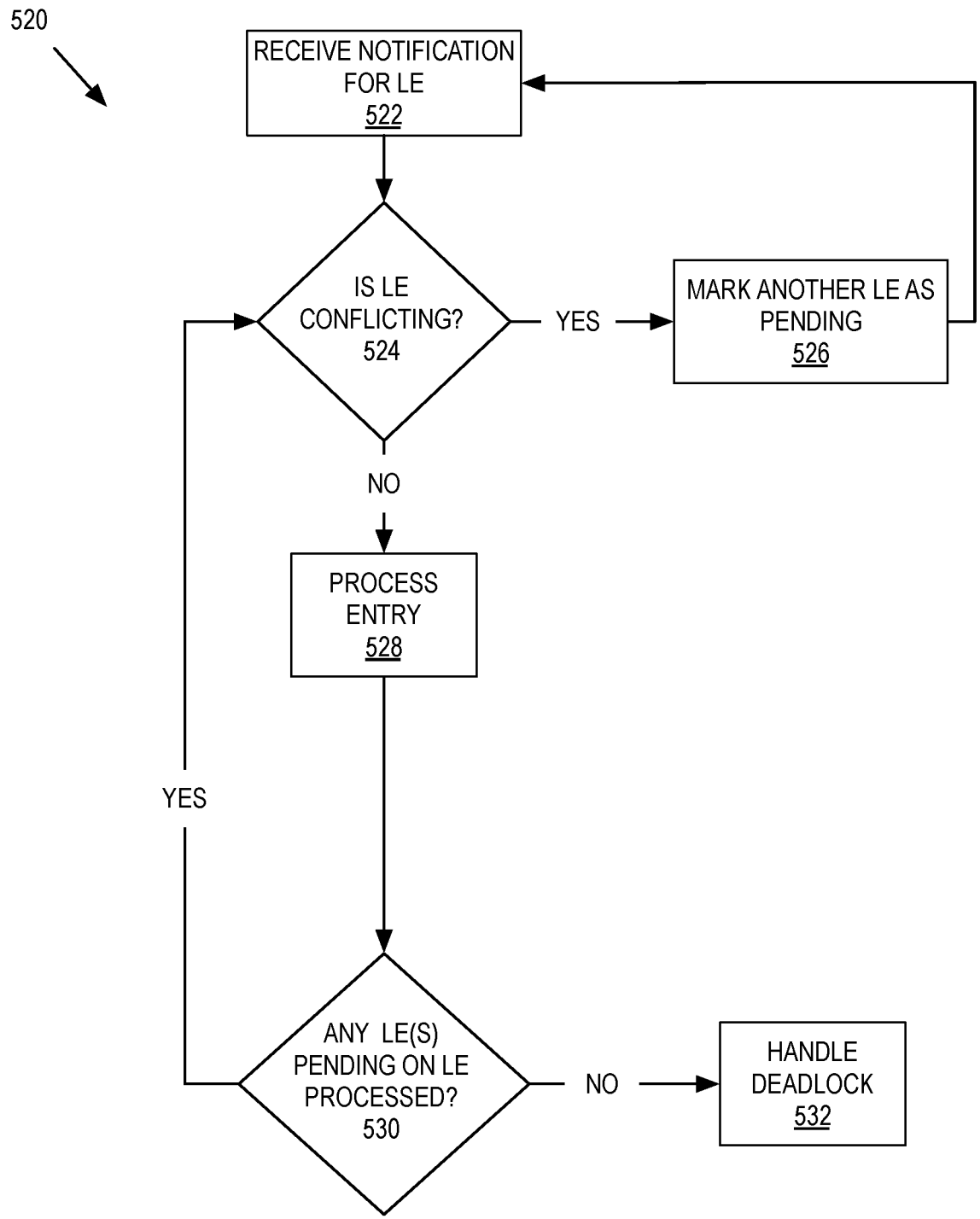
FIG. 5B is flow diagram of one embodiment of a process to process a lookup entry by keeping track of which entry is blocking another entry and proceeding to other pending lookup entries.

As described above, in one embodiment, the hardware writer can handle conflicting lookup entries by marking the current lookup entry as pending and proceeding to another lookup entry. In another embodiment, the hardware writer can handle conflicting lookup entries by keeping track of which lookup entry is blocking another lookup entry and proceeding to another lookup entry. FIG. 5B is flow diagram of one embodiment of a process to process a lookup entry by keeping track of which lookup entry is blocking another lookup entry and proceeding to other pending lookup entries. In one embodiment, a hardware writer performs process 520 to process the process a lookup entry, such as the hardware writer 316 as described in FIG. 3 above. In FIG. 5B, process 520 begins by receiving a notification for the lookup entry at block 522. In one embodiment, process 520 receives a notification of a lookup entry from the shared memory system, such as the shared memory system 314 as described in FIG. 3 above. In one embodiment, process 520 compares the operation identifier of a lookup entry that exists in the hardware table with the lookup entry corresponding to the lookup entry. If the operation identifier of the lookup entry in the shared memory system is greater, process 520 proceeds with processing the lookup entry corresponding to the notification. At block 524, process 520 determines if the lookup entry is conflicting. If the lookup entry is conflicting, process 520 marks another lookup entry as pending, stores which lookup entry is blocking which lookup entry in a conflicts database, and execution proceeds to block 522 above. In one embodiment, process 520 marks the conflicting lookup entry as pending.

If the lookup entry is not conflicting, process 520 process the lookup entry at block 528. For example and in one embodiment, process 520 can write a lookup entry to a location, delete a lookup entry from a location, or move a lookup entry from one location to another. At block 530, process 520 determines if there are any lookup entries that are pending on the lookup entry processed at block 528 by using a conflict database to limit a search for potential unblocked pending lookup entries. If there are, execution proceeds to block 524, where process 520 checks one of the lookup entries that is pending on the lookup entry processed at block 528. If there are no lookup entries that are pending on the lookup entry processed at block 528, process 520 handles any potential deadlock at block 532. In one embodiment, process 520 handles the deadlock as described in FIG. 5D below.

Figure 5C:
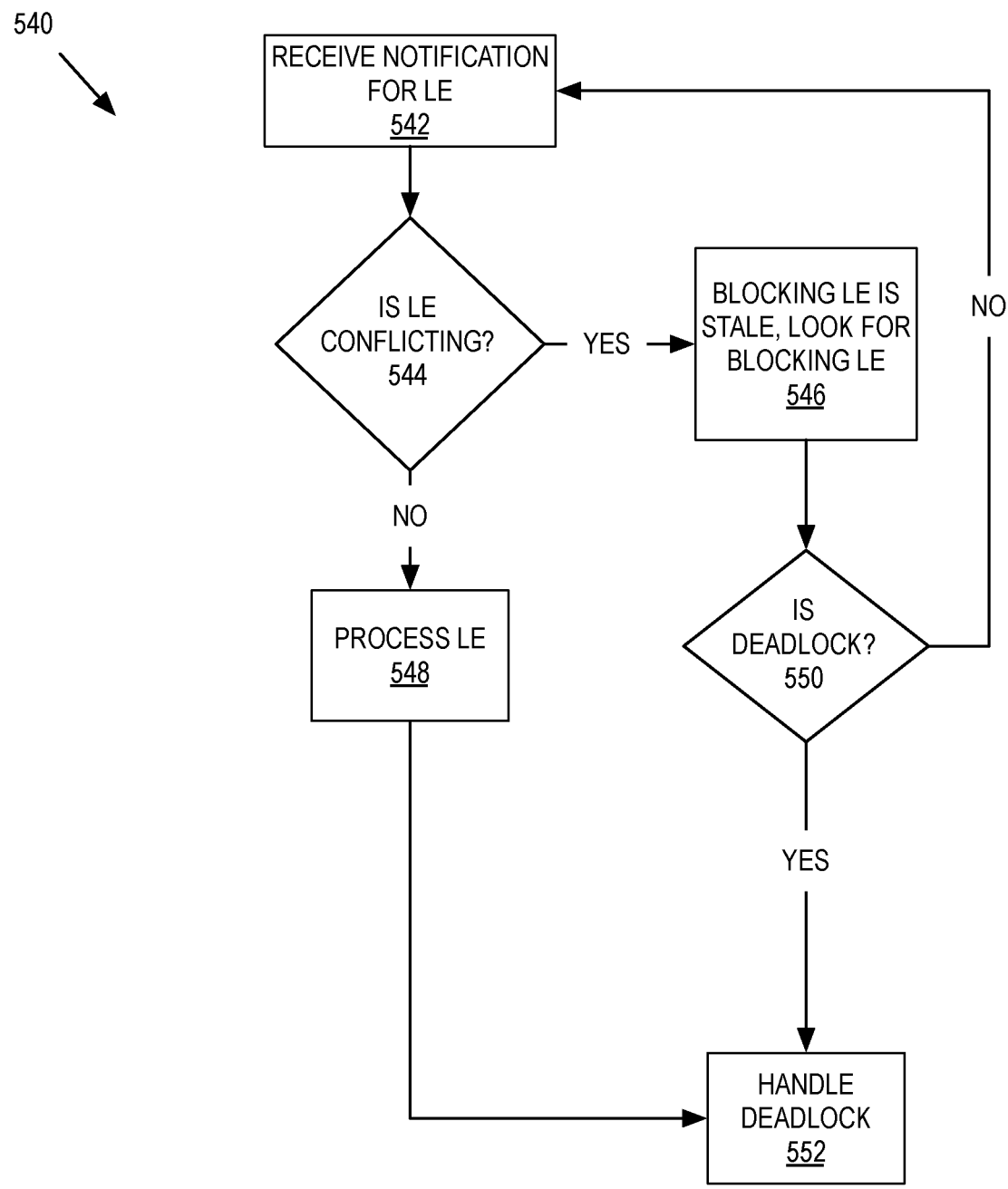
FIG. 5C is flow diagram of one embodiment of a process to process a lookup entry looking for a lookup entry in the shared memory system that is blocking another lookup entry.

In a further embodiment, the hardware writer can handle conflicting lookup entries by finding a corresponding lookup entry in the shared memory system for a blocking lookup entry and processing this corresponding lookup entry prior to handling a current lookup entry. FIG. 5C is flow diagram of one embodiment of a process to process a lookup entry looking for a lookup entry in the shared memory system that is blocking another lookup entry. In one embodiment, a hardware writer performs process 520 to process the process a lookup entry, such as the hardware writer 316 as described in FIG. 3 above. In FIG. 5C, process 540 begins by receiving a notification for the lookup entry at block 542. In one embodiment, process 540 receives a notification of a lookup entry from the shared memory system, such as the shared memory system 314 as described in FIG. 3 above. In one embodiment, process 540 compares the operation identifier of a lookup entry that exists in the hardware table with the lookup entry corresponding to the lookup entry. If the operation identifier of the lookup entry in the shared memory system is greater, process 540 proceeds with processing the lookup entry corresponding to the notification. At block 544, process 540 determines if the lookup entry is conflicting. If the current lookup entry is conflicting, process 500 determines that the blocking lookup entry is stale and looks for a corresponding lookup entry in the shared memory system. In one embodiment, a stale blocking lookup entry is a lookup entry that has a corresponding lookup entry in the shared memory system that has not been processed yet by process 540. In one embodiment, there exists a corresponding looking entry for the stale blocking lookup entry, because there will exist in the shared memory system a table modification for the stale blocking lookup entry. For example and in one embodiment, this table modification could be a move or delete to handle a location conflict for the stale blocking lookup entry. In one embodiment, process 540 processes the corresponding lookup entry for the stale blocking lookup entry. Execution proceeds to block 550 below.

If there is not a conflicting entry, process 540 processes the current lookup entry at block 548. For example and in one embodiment, process 500 can write a lookup entry to a location, delete a lookup entry from a location, or move a lookup entry from one location to another. Execution proceeds to block 552 below. At block 550, process 540 determines if there exists a deadlock situation. In one embodiment, the deadlock situation can be detected if there is a cycle in the stale and pending entries (e.g., there is a chain of lookup entries that loops back with the chain). If there is a deadlock situation, process 540 handles the deadlock at block 552. In one embodiment, process 540 handles the deadlock as described in FIG. 5D below. If there is no deadlock situation, execution proceeds to block 542 above.

Figure 5D:
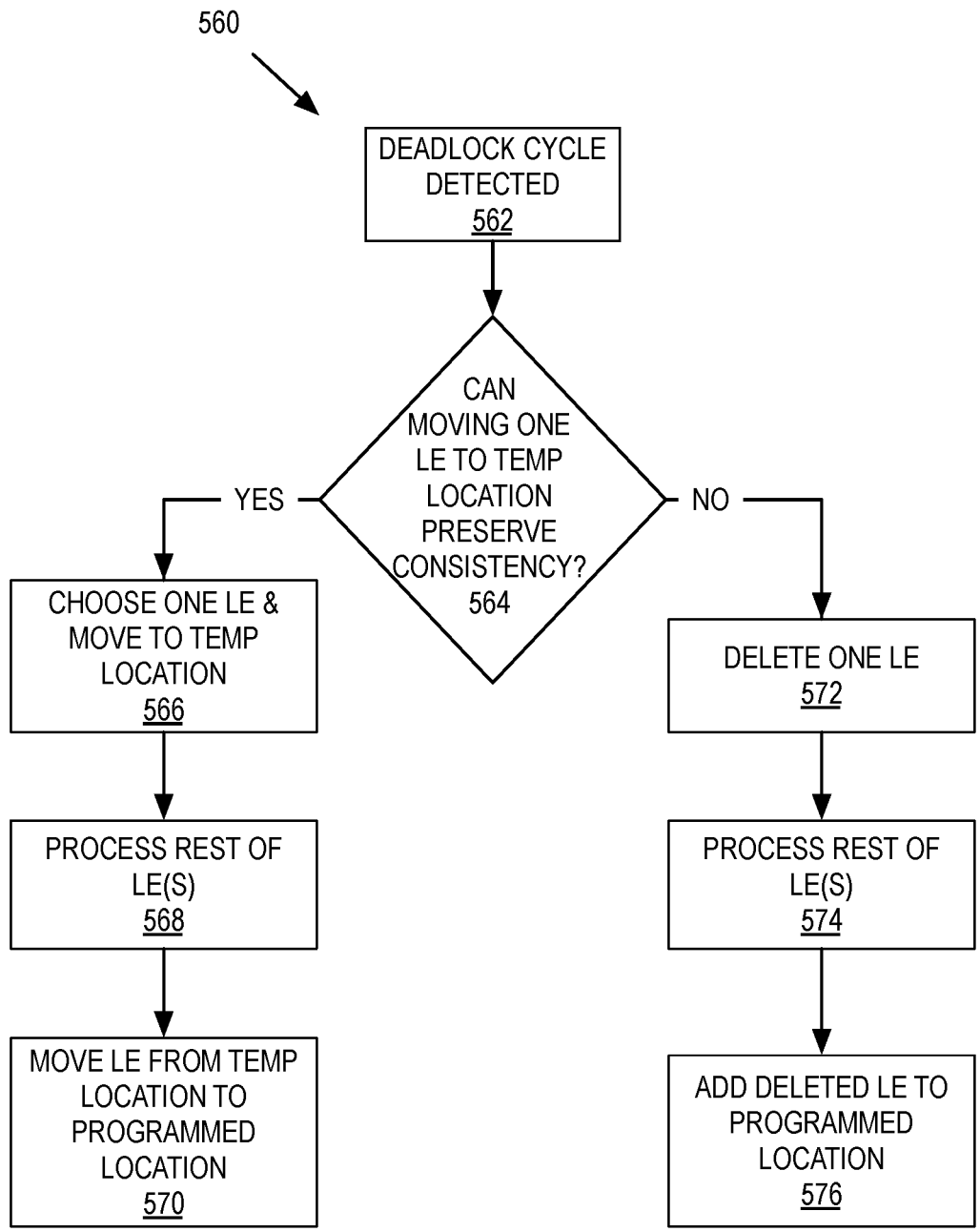
FIG. 5D is a flow diagram of one embodiment of a process to handle a deadlock situation.

FIG. 5D is a flow diagram of one embodiment of a process 560 to handle a deadlock situation. In one embodiment, process 560 is performed by a make before break module to handle a deadlock situation, such as the make before break module as described in FIG. 3, block 322 above. In FIG. 5B, process 560 detects a deadlock cycle at block 562. In one embodiment, a deadlock can occur when a chain of two or more lookup entries reference back to another one of the lookup entries in the chain. For example and in one embodiment, a deadlock can occur as described above in reference to the description regarding deadlocks associated with FIG. 3. In addition, various types of deadlocks can occur (e.g., address deadlock, TCAM deadlock, LPM deadlock, etc.).

At block 564, process 560 determines if moving one of the lookup entries in the deadlocked chain of lookup entries preserves consistency in the hardware table. For example and in one embodiment, process 560 can check to see if a potential move of one of the lookup entries that can break the deadlock still preserves the consistency of the hardware table (e.g., does not leave a lookup entry inaccessible). If the potential lookup entry move leaves the hardware table consistent, execution proceeds to block 566 below. If the potential lookup entry move leaves the hardware table inconsistent, execution proceeds to block 572 below.

At block 566, process 560 choose one lookup entry that breaks the deadlock in the chain of lookup entries and moves this lookup entry to a temporary location. In one embodiment, the temporary storage can be a section of the hardware table that is reserved for temporary storage of lookup up entries, such as an entry that is at the bottom of a table, top of a table, and/or somewhere in between. In another embodiment, the temporary storage can be a section of the table reserved for any type of lookup entry this table section is reserved based on a characteristic of the data. For example and in one embodiment, there could be temporary storage reserved for lookup entries of a certain length. In this example, the temporary storage is used to temporary store one or more lookup entries temporarily until these lookup entries can be moved to the desired destination for that lookup entry. Process 560 processes the rest of the lookup entries in the deadlocked chain at block 568. In one embodiment, by processing the rest of the lookup entries in the deadlocked chain, the deadlock is removed. At block 570, process 560 moves the lookup entry that was temporarily stored to the programmed location.

For example and in one embodiment, if a lookup entry is to be moved from location 10 to 20, where the lookup entry at location 20 is to be moved from location 20 to 30 and the lookup entry at location 30 is to be moved from location 30 to 10, a deadlock cycle occurs. In this example, process 560 can move the lookup entry at location 10 to the temporary location and further process the lookup entries at locations 20 and 30. By processing the rest of the lookup entries in the chain, the programmed location opens up for the temporarily stored lookup entry.

At block 572, process 560 deletes one of the lookup entries. In one embodiment, process 560 deletes this lookup entry so as break the deadlock chain of lookup entries. Process 560 processes the rest of the lookup entries in the deadlocked chain at block 574. In one embodiment, by processing the rest of the lookup entries in the deadlocked chain, the deadlock is removed. At block 576, process 560 adds the deleted lookup entry to the programmed location.

Figure 6:
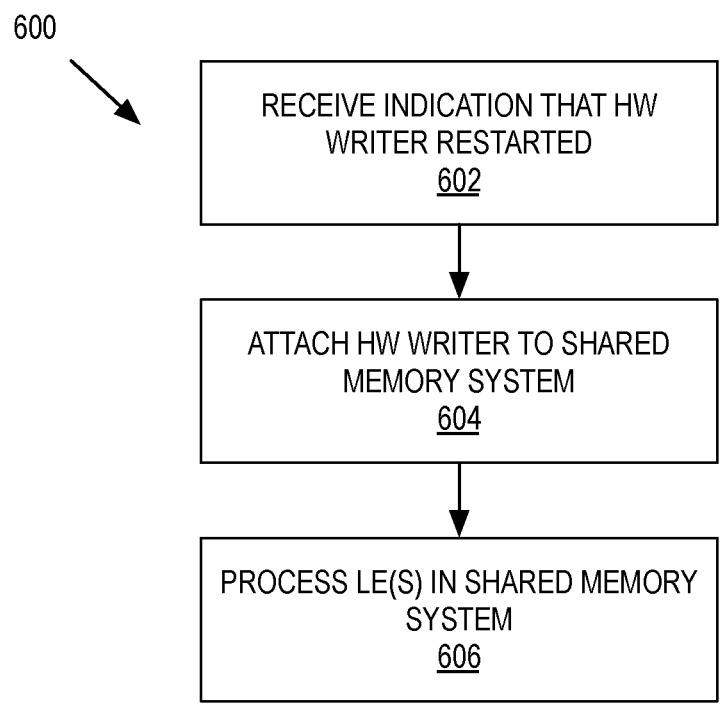
FIG. 6 is flow diagram of one embodiment of a process to configure a hardware table after a hardware writer restart.

In one embodiment, the hardware writer can restart (e.g., new line card inserted, line card reset, hardware writer reset, hardware writer firmware update, and/or other reason for a hardware reset) FIG. 6 is flow diagram of one embodiment of a process 600 to configure a hardware table after a hardware writer restart. In one embodiment, a hardware writer configures a hardware table, such as the hardware writer 316 described in FIG. 3 above. In FIG. 6, process 600 begins by receiving an indication that a hardware writer has restarted at block 602. In one embodiment, process 600 can receive the indication from the hardware writer indicating that this hardware writer has restarted. At block 604, process 600 attaches the hardware writer to the shared memory system. At block 606, process 600 iterates through the shared memory system and processes the lookup entries in the shared memory system. In one embodiment, by iteratively processing the lookup entries in the shared memory system, process 600 rebuilds the data that is stored in the hardware table. In this embodiment, if the hardware table is empty, process 600 can rebuild this data without conflicts, as process 600 can build this data in a non-disruptive manner. Alternatively, if there is an existing state in the hardware table, process 600 rebuild this data in a non-disruptive manner using one of the processes as described in FIGS. 5A-C above.

Figure 7A:
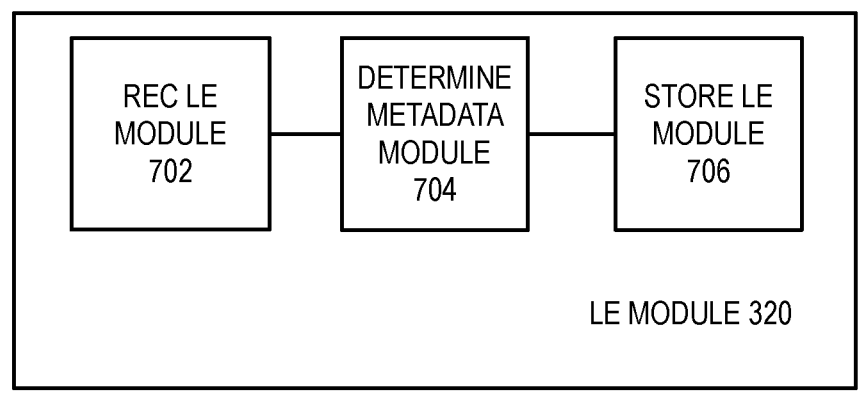
FIG. 7A is a block diagram of one embodiment of a lookup entry module that stores lookup entries to the shared memory system.

FIG. 7A is a block diagram of one embodiment of a lookup entry module 320 that stores lookup entries in the shared memory system. In one embodiment, the lookup entry module 332 includes receive lookup entry module 702, determine metadata module 704, and store lookup entry module 706 In this embodiment, the receive lookup entry module 702 receives the lookup entry as described in FIG. 4, block 402 above. The determine metadata module 704 determine the metadata for the lookup entry as described in FIG. 4, block 404 above. The store lookup entry module 706 stores the lookup entry in the shared memory system as described in FIG. 4, block 406 above.

Figure 7B:
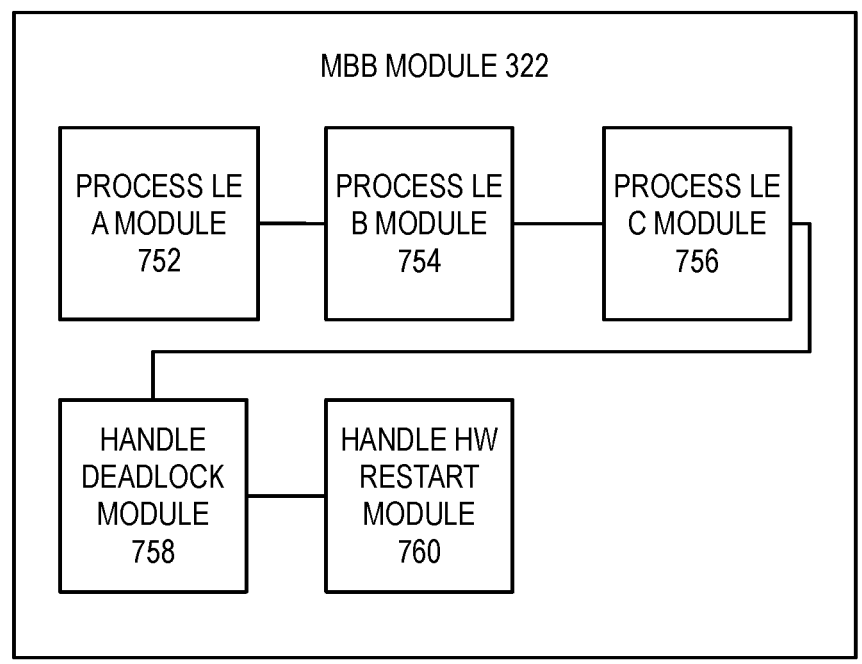
FIG. 7B is a block diagram of one embodiment of a make before break module that write data to a hardware table.

FIG. 7B is a block diagram of one embodiment of a make before break module 322 that writes data to a hardware table. In one embodiment, the make before break 322 includes a process lookup entry A module 752, process lookup entry B module 754, process lookup entry C module 756, handle deadlock module 758, and handle hardware writer restart module 760. The process lookup entry A module 752 processes the lookup entry as described in FIG. 5A above. The process lookup entry B module 754 processes the lookup entry as described in FIG. 5B above. The process lookup entry C module 756 processes the lookup entry as described in FIG. 5C above. The handle deadlock module 758 handles a potential deadlock as described in FIG. 5D above. The handle hardware writer restart module 760 handles a hardware writer restart as described in FIG. 6 above. In one embodiment, the make before break module 322 includes one or more of process lookup entry A module 752, process lookup entry B module 754, and/or process lookup entry C module 756.

Figure 8:
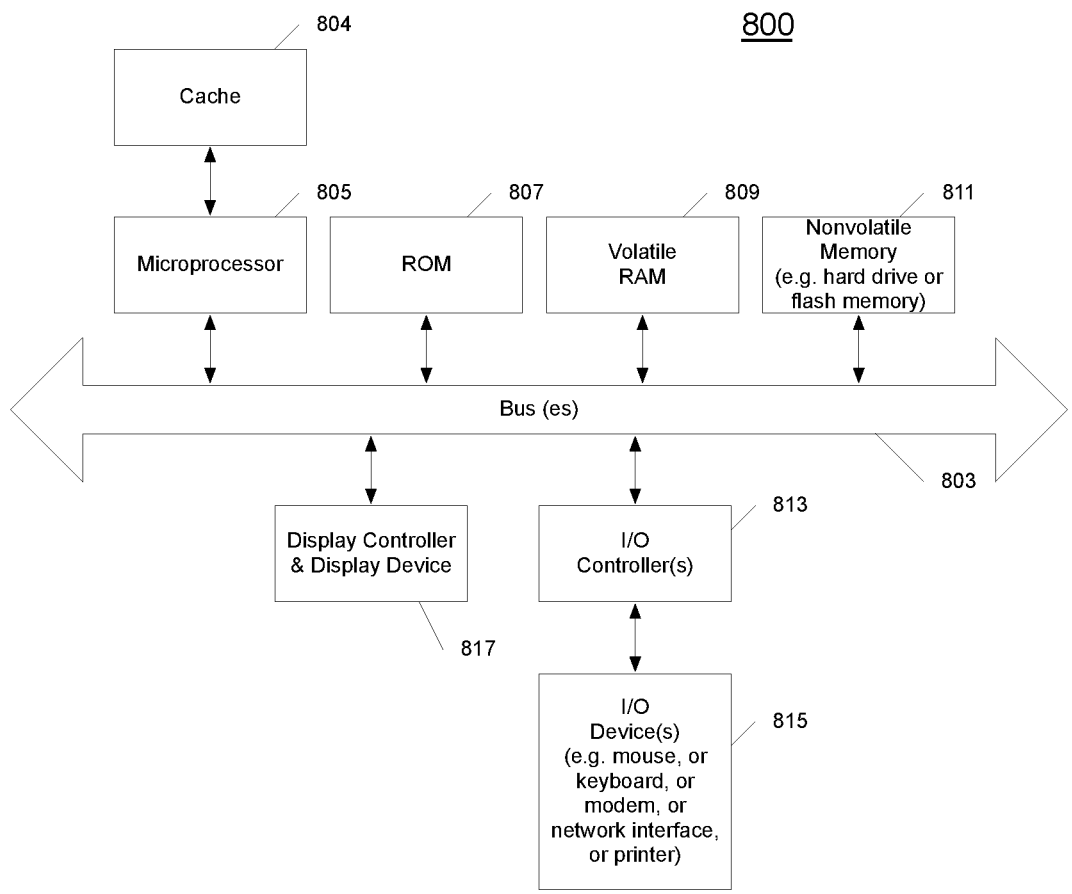
FIG. 8 illustrates one example of a typical computer system, which may be used in conjunction with the embodiments described herein.

FIG. 8 shows one example of a data processing system 800, which may be used with one embodiment of the present invention. For example, the system 800 may be implemented including a network element 300 as shown in FIG. 3. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 817 and to peripheral devices such as input/output (I/O) devices which may be mice, keyboards, modems, network interfaces, printers and other devices which are well known in the art. In one embodiment, the system 800 includes a plurality of network interfaces of the same or different type (e.g., Ethernet copper interface, Ethernet fiber interfaces, wireless, and/or other types of network interfaces). In this embodiment, the system 800 can include a forwarding engine to forward network date received on one interface out another interface.

Typically, the input/output devices 815 are coupled to the system through input/output controllers 813. The volatile RAM (Random Access Memory) 809 is typically implemented as dynamic RAM (DRAM), which requires power continually in order to refresh or maintain the data in the memory.

The mass storage 811 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 811 will also be a random-access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e g, a network connection)).

Figure 9:
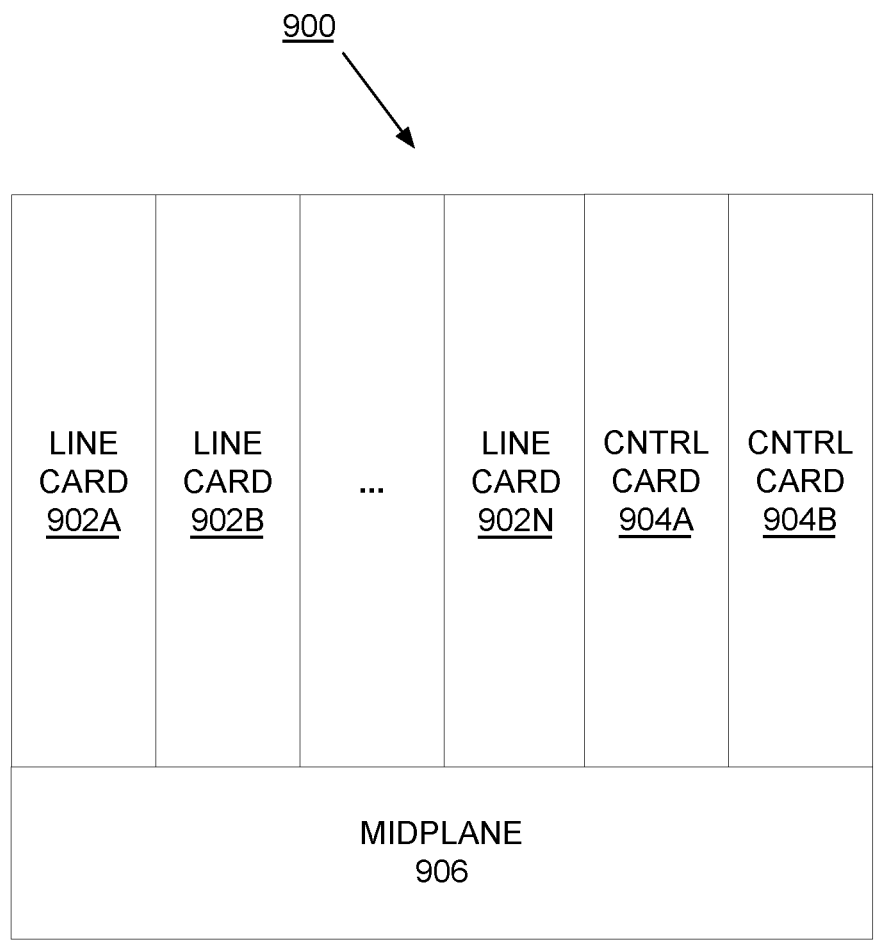
FIG. 9 is a block diagram of one embodiment of an exemplary network element that programs data to a hardware table in a network element.

FIG. 9 is a block diagram of one embodiment of an exemplary network element 900 that programs data to a hardware table. In FIG. 9, the midplane 906 couples to the line cards 902A-N and controller cards 904A-B. While in one embodiment, the controller cards 904A-B control the processing of the traffic by the line cards 902A-N, in alternate embodiments, the controller cards 904A-B, perform the same and/or different functions (e.g., programs data to a hardware table as described in FIGS. 3-6 above). In one embodiment, the line cards 902A-N processes network data. It should be understood that the architecture of the network element 900 illustrated in FIG. 9 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "detecting," "determining," "selecting," "storing," "coalescing," "processing," "performing," "configuring," "looking," "marking," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to store a lookup entry in a hardware table, the method comprising:
   receiving a notification of a coalesced lookup entry to be processed for a hardware table of a network element, wherein the hardware table includes a first plurality of lookup entries and the coalesced lookup entry is coalesced from a second plurality of lookup entries sharing a key;
   determining a location for a table modification associated with the coalesced lookup entry in the hardware table; and
   performing, with a hardware writer of the network element, the table modification associated with the coalesced lookup entry, wherein the hardware writer performs the table modification associated with the coalesced lookup entry in response to determining that the table modification associated with the coalesced lookup entry does not leave one of the first plurality of lookup entries inconsistent after the action is performed.

2. The machine-readable medium of claim 1, wherein the coalesced lookup entry is a lookup entry stored in a shared memory table with an operation identifier value that has not been processed by the hardware writer.

3. The machine-readable medium of claim 2, wherein the shared memory system is a shared memory hash table.

4. The machine-readable medium of claim 2, wherein the shared memory table is shared between a control plane and a data pane of the network element.

5. The machine-readable medium of claim 1, wherein the coalesced lookup entry includes at least one of a priority, a location, and an operation identifier.

6. The machine-readable medium of claim 1, further comprising:
  in response to determining that performing the table modification causes one of the first plurality of lookup entries in the hardware table to be inconsistent, looking for a second lookup entry that resolves the inconsistency.

7. The machine-readable medium of claim 1, wherein further comprising:
  in response to determining that performing the table modification causes one of the first plurality of lookup entries in the hardware table to be inconsistent, marking the coalesced lookup entry as dependent on a second lookup entry that resolves the inconsistency.

8. The machine-readable medium of claim 1, wherein the hardware table stores the coalesced lookup entry and other lookup entries in a priority order.

9. The machine-readable medium of claim 1, further comprising:
  determining if a lookup entry is dirty based on at least an operation identifier of the lookup entry.

10. A non-transitory machine-readable medium having executable instructions to cause one or more processing units to perform a method to store a lookup entry in a hardware table, the method comprising:
  receiving a coalesced lookup entry, wherein the coalesced lookup entry is coalesced from a plurality of lookup entries sharing a key;
  determining metadata for the lookup entry; and
  storing the coalesced lookup entry in shared memory, wherein the stored coalesced lookup entry includes the metadata, a plurality of hardware writers independently accesses the coalesced lookup entry using the metadata, and at least one of the plurality of hardware writers performs a table modification table modification associated with the coalesced lookup entry that results in a modification to an entry in a hardware table.

11. The machine-readable medium of claim 10, wherein the coalesced lookup entry includes a match criteria and a table action that corresponds to one or more physical entries in the hardware table that can be programmed in one or more locations of the hardware table.

12. The machine-readable medium of claim 10, wherein the metadata includes at least one of a priority, a hardware table location, and an operation identifier.

13. The machine-readable medium of claim 10, wherein the coalesced lookup entry is stored in a location in the shared memory.

14. A non-transitory machine-readable medium having executable instructions to cause one or more processing units to perform a method to handle a deadlock cycle of a plurality of lookup entries associated with a hardware table, the method comprising:
  detecting the deadlock cycle of the plurality of lookup entries associated with the hardware table, wherein each of the plurality of lookup entries has an associated table modification and a programmed location;
  determining that one of the plurality of lookup entries can be moved to a temporary location in the hardware table such that the hardware table is in a consistent state after the move;
  in response to the determining that one of the plurality of lookup entries can be moved to a temporary location, moving the one of the plurality of lookup entries to the temporary location;
  processing a table modification of at least another one of the plurality of lookup entries; and
  moving the one of the plurality of lookup entries to the programmed location.

15. The machine-readable medium of claim 14, wherein the temporary storage is at one of the beginning and the end of the hardware table.

16. The machine-readable medium of claim 14, wherein a location in the hardware table for the temporary storage is dependent on a characteristic of the lookup entry.

17. The machine-readable medium of claim 16, wherein the characteristic is one or more of a priority and a priority group associated with the lookup entry.

18. A non-transitory machine-readable medium having executable instructions to cause one or more processing units to perform a method to handle a deadlock cycle of a plurality of lookup entries associated with a hardware table, the method comprising:
  detecting the deadlock cycle of the plurality of lookup entries associated with the hardware table, wherein each of the plurality of lookup entries has an associated table modification and a programmed location;
  determining that none of the plurality of lookup entries can be moved to a temporary location in the hardware table such that the hardware table is in a consistent state after the move;
  in response to the determining that none of the plurality of lookup entries can be moved to a temporary location, deleting the one of the plurality of lookup entries;
  processing a table modification of at least another one of the plurality of lookup entries; and
  adding the another one of the plurality of lookup entries to the programmed location.

* * * * *